(12) United States Patent
Huettner et al.

(10) Patent No.: US 9,712,210 B2
(45) Date of Patent: Jul. 18, 2017

(54) METHOD AND SYSTEM FOR SUPPLYING ENERGY TO AT LEAST ONE MOBILE COMPONENT IN A WIRELESS COMMUNICATIONS SYSTEM, IN PARTICULAR TO RFID TAGS OF AN RFID SYSTEM

(71) Applicant: SIEMENS AKTIENGESELLSCHAFT, Munich (DE)

(72) Inventors: Joerg Huettner, Munich (DE); Dominikus Joachim Mueller, Munich (DE); Andreas Ziroff, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 618 days.

(21) Appl. No.: 14/351,609

(22) PCT Filed: Oct. 15, 2012

(86) PCT No.: PCT/EP2012/070417
§ 371 (c)(1),
(2) Date: Apr. 14, 2014

(87) PCT Pub. No.: WO2013/053945
PCT Pub. Date: Apr. 18, 2013

(65) Prior Publication Data
US 2014/0246921 A1    Sep. 4, 2014

(30) Foreign Application Priority Data
Oct. 14, 2011   (DE) .................. 10 2011 084 538

(51) Int. Cl.
*H04B 5/00* (2006.01)
*G06K 7/10* (2006.01)
(Continued)

(52) U.S. Cl.
CPC ......... *H04B 5/0037* (2013.01); *G06K 7/0008* (2013.01); *G06K 7/10089* (2013.01);
(Continued)

(58) Field of Classification Search
CPC ..... H04B 5/0037; H06K 7/0008; H02J 50/20; G06K 7/10029; G06K 7/10079; G06K 7/10316; G06K 7/10336
See application file for complete search history.

(56) References Cited

U.S. PATENT DOCUMENTS

| | | | |
|---|---|---|---|
| 7,983,710 B2 * | 7/2011 | Foschini | H04W 16/12 455/403 |
| 8,222,998 B2 | 7/2012 | Fuchs et al. | 340/10.1 |

(Continued)

FOREIGN PATENT DOCUMENTS

| | | | |
|---|---|---|---|
| CN | 101536010 A | 9/2009 | G06K 7/00 |
| CN | 101729695 A | 6/2010 | H04M 3/51 |

(Continued)

OTHER PUBLICATIONS

European Office Action for related European Patent Application No. 12781055.4, issued May 6, 2015, 4 pages.
(Continued)

Primary Examiner — Ryan Johnson
(74) Attorney, Agent, or Firm — Slayden Grubert Beard PLLC

(57) ABSTRACT

A method and system supply energy to at least one mobile component in a wireless communications system, in particular to RFID tags of an RFID system. In the method for supplying energy to at least one mobile component in a wireless communications system with two or more base stations, coherent electromagnetic waves are transmitted by at least two of the base stations. In the system of base stations of a wireless communications system, at least two of
(Continued)

the base stations are designed for transmitting coherent electromagnetic waves.

14 Claims, 4 Drawing Sheets

(51) Int. Cl.
G06K 7/00 (2006.01)
H02J 50/20 (2016.01)
(52) U.S. Cl.
CPC ..... G06K 7/10158 (2013.01); G06K 7/10356 (2013.01); H02J 50/20 (2016.02)

(56) References Cited

U.S. PATENT DOCUMENTS

| | | | |
|---|---|---|---|
| 8,385,971 B2 | 2/2013 | Rhoads et al. | ............. 455/556.1 |
| 2005/0280538 A1 | 12/2005 | Kawai et al. | |
| 2010/0039231 A1 | 2/2010 | Fuchs et al. | |

FOREIGN PATENT DOCUMENTS

| | | | |
|---|---|---|---|
| CN | 102216941 A | 10/2011 | ............... G06K 9/00 |
| DE | 102011084538.0 | 10/2011 | |
| EP | 1610258 | 12/2005 | |
| WO | PCT/EP2012/070417 | 10/2012 | |

OTHER PUBLICATIONS

English Language International Search Report for PCT/EP2012/070417, mailed Feb. 13, 2013, 2 pages.
Chinese Office Action, Application No. 201280050613.5, 13 pages, Feb. 26, 2016.

* cited by examiner

//METHOD AND SYSTEM FOR SUPPLYING ENERGY TO AT LEAST ONE MOBILE COMPONENT IN A WIRELESS COMMUNICATIONS SYSTEM, IN PARTICULAR TO RFID TAGS OF AN RFID SYSTEM

CROSS REFERENCE TO RELATED APPLICATIONS

This application is based on and hereby claims priority to International Application No. PCT/EP2012/070417 filed on Oct. 15, 2012 and German Application No. 10 2011 084 538.0 filed on Oct. 14, 2011, the contents of which are hereby incorporated by reference.

BACKGROUND

The invention relates to a method for supplying power to at least one mobile part in a wireless communication system and to a system of base stations in a wireless communication system.

In communication systems, it is known practice to supply power to individual mobile parts via a radio field. An example is passive RFID systems, the mobile parts of which, what are known as RFID tags, particularly RFID chips with an RFID transponder, obtain power via the radio field and hence are able to operate an internal arithmetic and logic unit without further supply of power for a period of time so long as the radio field provides sufficient power. When this case arises, a tag is able to transmit a response signal that can be received by a base station or by an appropriate reader, for example. In order to obtain a response signal even when there is insufficient radio field strength and in order to increase the range, active tags with a dedicated current source, i.e. in the form of a battery, are used.

SUMMARY

One potential object is to provide an improved method and an improved system for supplying power to at least one mobile part in a wireless communication system.

The inventors propose a method for supplying power to at least one mobile part. To this end, the method is carried out in a wireless communication system having two or more base stations. The method involves the use of at least two of the base stations to coherently send electromagnetic waves.

A particularly important aspect of the method is that the base stations transmit their power in the form of electromagnetic waves coherently, that is to say with a fixed phase relationship between the electromagnetic waves transmitted by various base stations.

The inventors' proposals allow this fixed phase relationship to be used such that at particular positions in space there is an increase in the electromagnetic radio field strength that can be measured at said positions in comparison with a system having just one base station.

An increase occurs at such a position precisely when the electromagnetic waves from the individual base stations arrive at said position with the same (or almost the same) phase relationship (i.e. with the same or almost the same phase) (constructive superimposition of electromagnetic waves). Advantageously, one such position is the location of the mobile part. In particular, a phase angle that is almost the same is intended to be understood within the context of this document to mean a phase angle for which the waves arrive at such a position, particularly at the location of the mobile part, with a relative phase shift with respect to one another that is less than one eighth, preferably less than one sixteenth and ideally less than one thirty-second part of the wavelength of the electromagnetic waves. Suitably, for an optimum supply of power to the mobile part in the form of an, in particular passive, electronic appliance, the sending phases of the individual base stations are adjusted such that constructive superimposition of the incoming electromagnetic waves is produced precisely at the spatial point at which the mobile part is situated.

In the case of the method, this can preferably be accomplished by knowledge of the propagation delay phases. On the basis of this knowledge, the sending phases are preferably adjusted or reset by the propagation delay phase offset in the various radio channels or transmission paths between the base stations and the mobile part, so that the signals arrive at the mobile part with an identical phase.

In this way, it is possible to increase the radio field strength at the respective location of the mobile part in comparison with a system having just one base station. Since the radio field strength is location-dependent, knowledge of the precise mobile part position is desirable.

The proposals therefore use, particularly at the same time, a combination of particular system properties, namely both of the supply of power to the mobile part and of location of the mobile part and expediently also position tracking for the mobile part.

Preferably, the method involves the phase angles of the electromagnetic waves transmitted by each of the at least two base stations being adjusted such that the electromagnetic waves arrive at the location of the mobile station in phase. Suitably, this is accomplished by selecting the respective start phase (also called sending phase within the context of this application) of the electromagnetic waves at the location of the base stations in each case such that the different phase angles that would arise from different propagation delays of the electromagnetic waves given the same start phases are compensated for. Expediently, the system involves the base stations being designed to set the respective phase angle of the electromagnetic waves, particularly on the basis of time.

The knowledge of the propagation delay phases of the electromagnetic waves simultaneously allows location or determination of the position of the mobile part. This can be accomplished by using various algorithms, some of which are known from already existing localization systems. This therefore also results in opportunities to make the phase settings for the base stations on an adaptive basis so as to ensure that even a moving mobile part is supplied with power.

In a particularly advantageous development of the method, the two or at least two of the base stations are also used to receive signals that are transmitted by the mobile parts and to evaluate the phase information item or phase information items in the received signals. These phase information items are used to locate and track the position of the mobile part and can also be used to optimize the supply of power to the mobile part by appropriate tracking of the sending phases of the base stations.

Similarly, it is possible to use a large number of further different known radio location systems or methods that can involve a position information item for the mobile part being obtained from various measurable variables for the wave propagation between mobile part and base stations. Such variables may suitably be:
    the reception field strength at the location of the mobile part and/or the propagation delay(s) of signals between a base station and a mobile part in each case and/or propagation delay differences and/or one or more angle information item(s) in the signal sent by the mobile part and arriving at a base station.

Expediently, the method involves a plurality of base stations/antennas, which are distributed in a space, being used to transmit electromagnetic waves at the same power and said base stations/antennas being used to receive electromagnetic waves sent by a mobile part. This is done in a coherent manner and is performed with adjustable phase relationships. In order to avoid interference among the base stations, one development provides for control for all base stations, so that a request from a base station to a mobile part is not interpreted as a collision or as an interference signal by another base station. A request to a mobile part can expediently be made only using an explicit identifier for a base station.

The method can involve the phases being ascertained and adjusted in various ways. By way of example, in cases in which no mobile parts are recognized on account of an excessively low radio field strength, the phase settings of the individual base stations can be made by trial and error. In this case, the phases are iteratively optimized such that the radio field strength received by the mobile part is maximized. As an indicator, it is possible to use a response signal at the mobile part.

If a sufficiently high radio field strength is already existent at the mobile part, the method involves the phase determination being estimated from a motion model when the position of the mobile part changes over time. On the basis of such a motion model (e.g. mobile part is in rather uniform motion), it is possible to infer a correspondingly uniform trend in the optimum phases over time. Appropriate mathematical regulatory methods are known for this per se (particularly Kalman filters).

The use of a plurality of mobile parts is likewise conceivable for the method. In this regard, it is possible to use the time-division multiplexing method to change over between various sets of optimum phase coefficients, and it is thus possible to select the optimum coefficients for given positions in each case. This allows the method to be carried out with a plurality of mobile parts.

A particularly preferred development of the method involves the mobile part for its part transmitting a radio signal in order to ascertain optimum phase coefficients. On the basis of the reciprocity of the radio channel, it is then possible for the phase information item in the received signal, which phase information item is measured by the base stations, to be converted into optimum sending phases. This development of the method can be used to determine the optimum phase coefficients within one or a few read cycles.

In the method, it is possible to infer the position of the mobile part from the knowledge of the phase coefficients. To this end, the method involves the base stations expediently being arranged in one or more groups, the received signals of which are algorithmically combined with one another. Ideally, the base stations are arranged along a straight line at intervals, particularly shorter than the wavelength of the electromagnetic waves, from one another. Under these conditions, it is possible to take the phase differences in the signals received from the mobile part, for example, in order to work out the angle at which the mobile part appears from the point of view of the straight line of these base stations. Corresponding methods are known under the headword "digital beamforming".

Besides "digital beamforming", "analog beamforming" is also conceivable, which is implemented by a highly focussing radiation characteristic, particularly an antenna lobe, radiated in each case by an antenna on a base station. Depending on the phase settings of the individual antenna within an antenna group, it is possible to swivel such an antenna lobe in various directions. The relatively high antenna gain produced by interconnecting antennas from a plurality of base stations likewise brings about an increased radio field strength in the preferred spatial direction.

In addition, it is possible to infer the location of the mobile part from the reception field strength of the signal received from the mobile part too. Appropriate algorithms are known per se and are related art.

In addition, it is possible to infer the position of the mobile part from the phases of the base stations overall, assuming a sufficiently large number of base stations, even when the base stations are in a very general arrangement.

From the time profile of the relevant phases and reception field strengths, it is also possible to use tracking algorithms to obtain an improvement in the position estimation. Hence, it is possible to sense a movement by a mobile part and to adaptively regulate the phase settings of the base station.

The inventors also propose a of base stations in a wireless communication system. In the case of the system, at least two of the base stations are designed to send coherent electromagnetic waves.

Expediently, the system is designed to carry out a method as explained above.

In order to realize the supply of power and the associated range increase and also the opportunity for location and position tracking, the base stations are operated in sync by the method. An appropriate control unit for actuating the base stations is preferably part of the system.

Suitably, the system of base stations is designed to carry out the time-division multiplexing method in line with the method as explained above.

With particular preference, the method for supplying power to a mobile part in the form of an RFID tag is carried out in a communication system in the guise of an RFID system. The system is an RFID system in an advantageous development.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
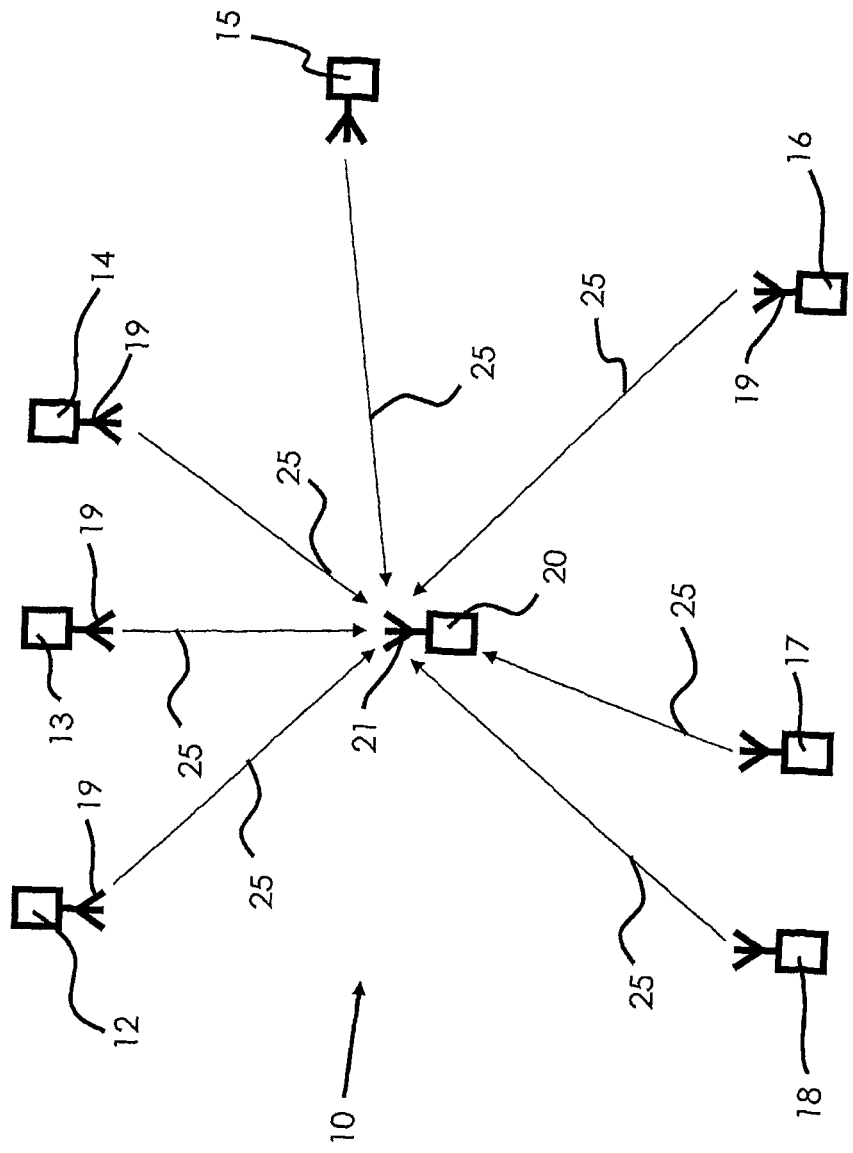
FIG. 1 shows a basic outline in plan view of a system of base stations for carrying out the propose method during the sending of electromagnetic waves to a mobile part.

Reference will now be made in detail to the preferred embodiments of the present invention, examples of which are illustrated in the accompanying drawings, wherein like reference numerals refer to like elements throughout.

The proposed wireless communication system 10 that is shown in FIG. 1 comprises a plurality of base stations 12, 13, 14, 15, 16, 17, 18. The base stations 12, 13, 14, 15, 16, 17, 18 use antennas 19 for supplying power to a mobile part 20 to simultaneously transmit electromagnetic waves 25. The electromagnetic waves 25 are received by the mobile part 20 by an antenna 21.

In the exemplary embodiment shown, the base stations 12, 13, 14, 15, 16, 17, 18 send each of the electromagnetic waves 25 at the same power and coherently, i.e. with a respective prescribed phase angle in relation to one another. In order to avoid interference among the base stations 12, 13, 14, 15, 16, 17, 18, a control and evaluation device (not shown explicitly in FIG. 1) is provided for all the base stations 12, 13, 14, 15, 16, 17, 18, so that a request from one of the base stations 12, 13, 14, 15, 16, 17, 18 to the mobile part 20 is not interpreted as a colliding signal or an interference signal by another of the base stations 12, 13, 14, 15, 16, 17, 18. In the exemplary embodiment shown, a request to the mobile part 20 is made using an explicit identifier for a respective one of the base stations 12, 13, 14, 15, 16, 17, 18.

The relative phase angles of the electromagnetic waves 25 sent by the base stations 12, 13, 14, 15, 16, 17, 18 in relation to one another are chosen such that the electromagnetic waves 25 are constructively superimposed at the location of the mobile part 20. The energy in the radio field, which energy is therefore highly concentrated at the location of the mobile part 20, is picked up by the antenna 21 of the mobile part 20 and converted into electric power therein. This electric power can be used to operate the mobile part 20.

Figure 4:
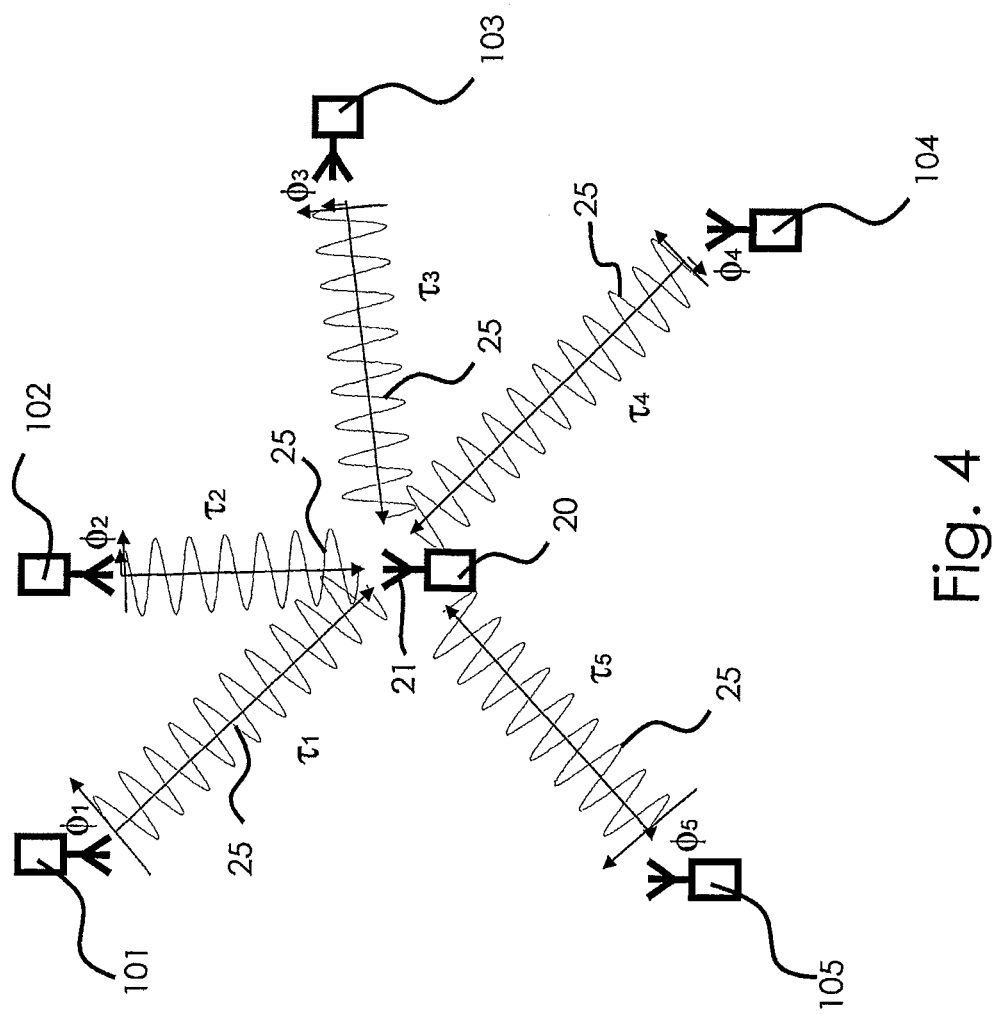
FIG. 4 shows a basic outline in plan view of a further exemplary embodiment of a system of base stations for carrying out the proposed method with a presentation of the phase relationships of the sent electromagnetic waves.

This principle is additionally illustrated by FIG. 4 with the aid of a presentation of the phase relationships between the respective electromagnetic waves 25 sent by a base station (although the arrangement of the base stations shown in FIG. 4 differs from that shown in FIG. 1, the principle presented in FIG. 4 can be transferred in corresponding fashion to the exemplary embodiment shown in FIG. 1 and to all the other exemplary embodiments explained): the base stations 101, 102, 103, 104, 105 shown in FIG. 4 coherently send electromagnetic waves 25 to the mobile part 20. The electromagnetic waves 25 are each sent with a dedicated sending phase $\Phi_1, \Phi_2, \Phi_3, \Phi_4, \Phi_5$ by the base stations 101, 102, 103, 104, 105. On account of the different intervals of the base stations 101, 102, 103, 104, 105 from the mobile part 20, the electromagnetic waves 25 from the individual base stations 101, 102, 103, 104, 105 each have different propagation delays $\tau_1, \tau_2, \tau_3, \tau_4, \tau_5$ to the mobile part 20. The sending phases $\Phi_1, \Phi_2, \Phi_3, \Phi_4, \Phi_5$ are chosen such that the electromagnetic waves 25 arrive at the mobile part 20 with an identical phase angle. In this way, the electromagnetic waves 25 are constructively superimposed on the mobile part 20 to form a particularly strong overall field.

Figure 2:
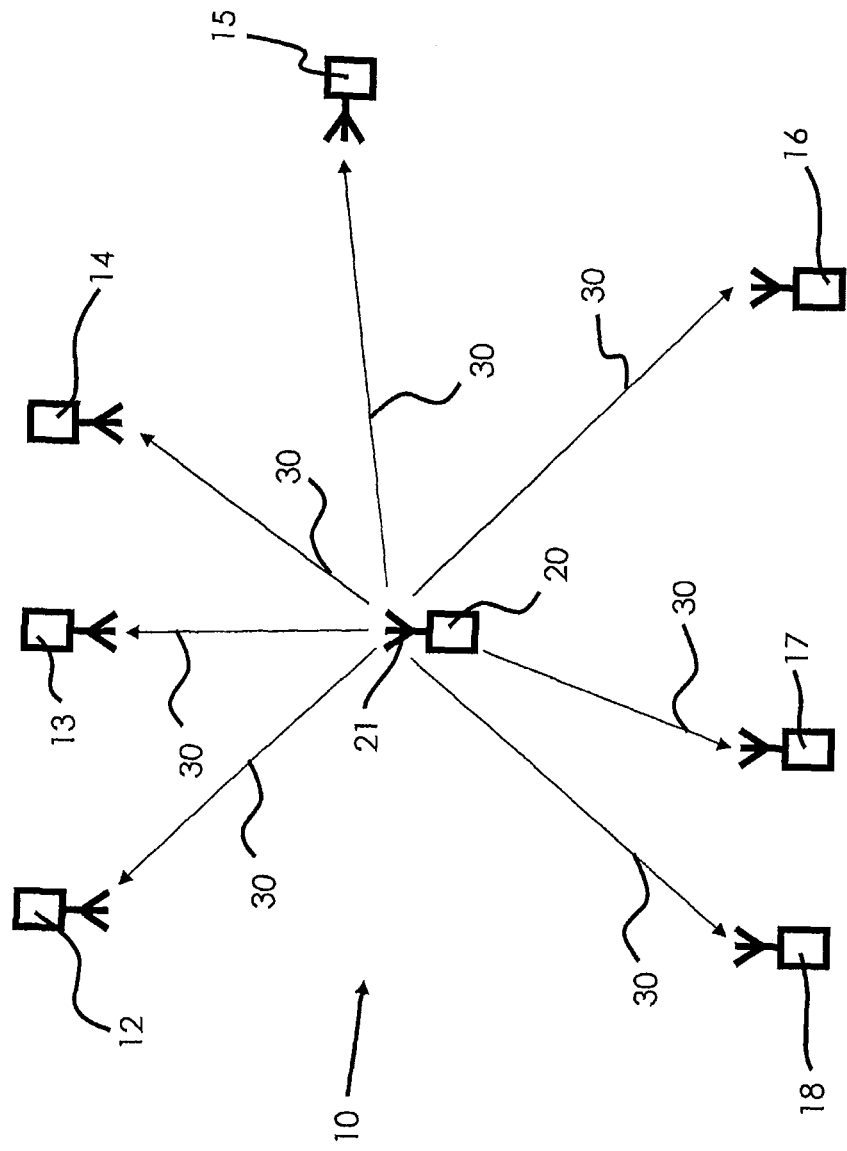
FIG. 2 shows a basic outline in plan view of the proposed system shown in FIG. 1 during the reception of electromagnetic waves by the mobile part.

In the exemplary embodiment shown in FIG. 1, the relative phase angles of the electromagnetic waves 25 sent by the base stations 12, 13, 14, 15, 16, 17, 18 are ascertained such that the mobile part 20 transmits a radio signal 30 (FIG. 2). The radio signal 30 is received by the base stations 12, 13, 14, 15, 16, 17, 18. The control and evaluation device is used to determine the phase angles of the electromagnetic waves 25 respectively received by the base stations 12, 13, 14, 15, 16, 17, 18 at the locations of the respective base stations 12, 13, 14, 15, 16, 17, 18 in relation to one another. From the phase angles determined in this manner, suitable sending phases (cf. FIG. 4) are ascertained. Such determination is carried out once or repeatedly over time.

Figure 3:
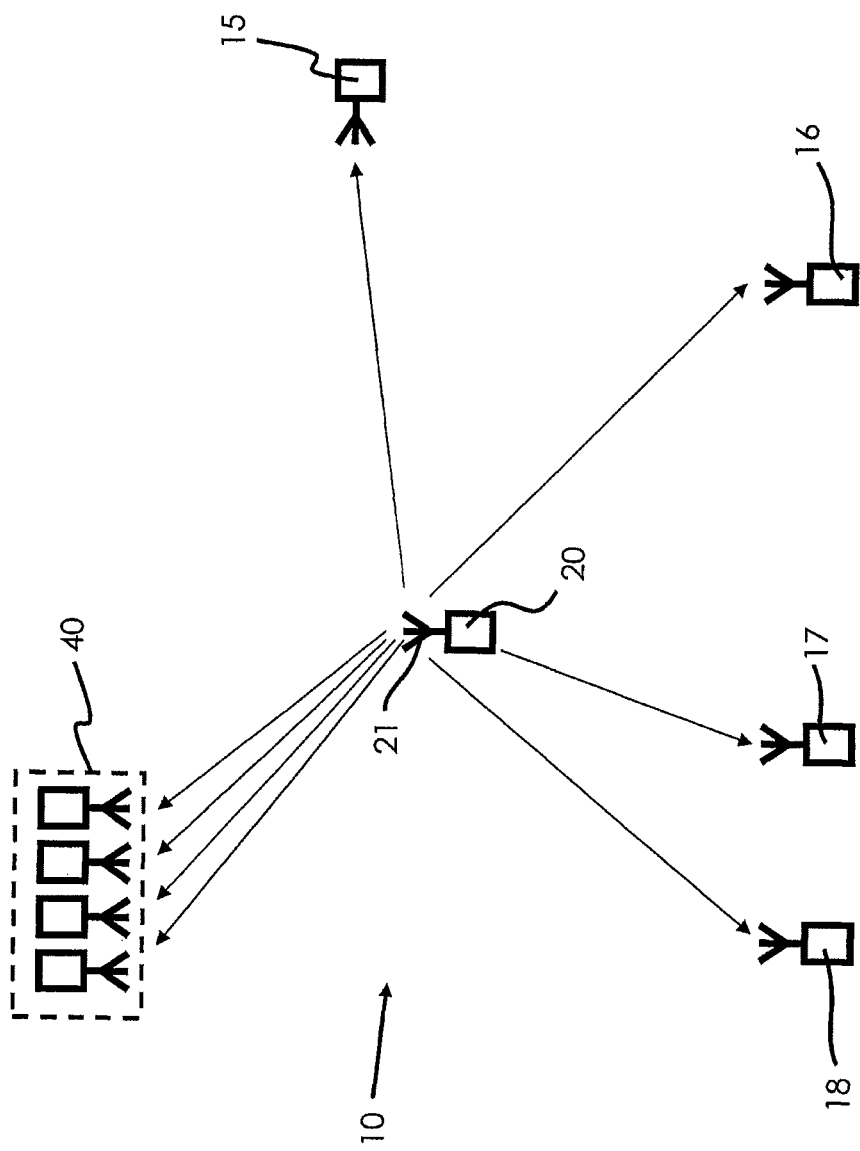
FIG. 3 shows a basic outline in plan view of a further exemplary embodiment of a proposed system of base stations for carrying out the method with a group of base stations arranged along a straight line.

The exemplary embodiment shown in FIG. 3 corresponds to the exemplary embodiment shown in FIGS. 1 and 2. In addition, however, carrying out the method using the system shown in FIG. 3 involves the position of the mobile part 20 being inferred from the knowledge of the phase coefficients. For this purpose, a group 40 of base stations is arranged along a straight line in a closely adjacent manner, i.e. with intervals to the nearest respective neighbors of less than a wavelength of the electromagnetic waves 25. The received signals received by the base stations in the group 40 are algorithmically combined with one another. The phase differences in the signals received from the mobile part 20 are used in a manner that is known per se (for example from the techniques of "Digital Beamforming") to infer the angle formed by the direction of the mobile part 20 and the straight line along which the base stations in the group 40 are arranged.

Besides "digital beamforming", further exemplary embodiments also use "analog beamforming", which results in a highly focussing lobe for the electromagnetic waves radiated by the antennas on a group of base stations. Depending on the phase settings of an individual antenna 19 within the group of base stations, this lobe can be swiveled in various directions. The relatively high antenna gain produced by the interconnection of the antennas on the group 40 of base stations likewise brings about an increased radio field strength in the preferred spatial direction.

In further exemplary embodiments, not shown separately, which otherwise correspond to the exemplary embodiments shown, the location and/or situation of the mobile part 20 is additionally inferred from the reception field strength of the signal received from the mobile part 20. The algorithms required for this purpose are known per se.

In addition, it is possible to draw conclusions regarding the position of the mobile part from the phases of the base stations 12, 13, 14, 15, 16, 17, 18 overall, assuming a sufficiently large number of base stations, even under very general conditions as far as the situation of the base stations 12, 13, 14, 15, 16, 17, 18 is concerned.

From the time profile of the relevant sending $\Phi_1, \Phi_2, \Phi_3, \Phi_4, \Phi_5$ and/or receiving phases and reception field strengths, it is also possible to use tracking algorithms to obtain an improvement in the position estimation. Hence, it is possible to sense a movement by the mobile part and to adaptively regulate the phase settings of the base stations 12, 13, 14, 15, 16, 17, 18.

In a further exemplary embodiment, not shown specifically, which otherwise corresponds to those shown, a plurality of mobile parts are supplied with power. To this end, the time-division multiplexing method is used to change over between various sets of optimum phase coefficients and in this way the respective optimum coefficients for the position of each mobile part are selected and set. This means that in this exemplary embodiment the system of base stations is configured with multisubscriber capability.

By way of example, the mobile part 20 in the exemplary embodiments explained is an RFID tag and the base stations 12, 13, 14, 15, 16, 17, 18, 101, 102, 103, 104, 105 are base stations in an RFID system. In further exemplary embodiments, the mobile part 20 is another mobile part and the base stations 12, 13, 14, 15, 16, 17, 18, 101, 102, 103, 104, 105 form another radio-based communication system.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for supplying power to a mobile part in a wireless communication system, comprising:
    coherently sending electromagnetic waves to the mobile part from at least two base stations;
    controlling at least one of the base stations to adjust relative sending phases between the electromagnetic waves sent from the at least two base stations;
    identifying propagation delay phases between the electromagnetic waves sent from the at least two of the base stations; and
    adjusting relative sending phases between the electromagnetic waves sent from the at least two base stations.

2. The method as claimed in claim 1, wherein energy in an electrical field from the coherently sent electromagnetic waves is used at a location of the mobile part to supply power to the mobile part.

3. The method as claimed in claim 1, wherein the relative sending phases are adjusted based on trial and error.

4. The method as claimed in claim 1, wherein the mobile part transmits a signal that is received by the at least two base stations, propagation delay phases of the signal received by the at least two base stations are sensed, and at least one of the sending phases is adjusted based on a propagation delay phase offset.

5. The method as claimed in claim 1, wherein the propagation delay phases are monitored over time, and changes in the propagation delay phase(s) over time are used to select, change and/or customize at least one of the sending phases.

6. The method as claimed in claim 1, wherein the electromagnetic waves are sent by a digital beamforming method.

7. The method as claimed in claim 1, wherein the electromagnetic waves are sent by an analog beamforming method.

8. The method as claimed in claim 1, wherein the mobile part transmits a response signal that is received by the at least two base stations, and the relative sending phases are adjusted based on trial and error to maximize a received signal strength of the response signal.

9. The method as claimed in claim 1, wherein the electromagnetic waves are coherently sent such that the electromagnetic waves are coherently received in phase at a location of the mobile part.

10. A method for supplying power to a mobile part in a wireless communication system, comprising:
    coherently sending electromagnetic waves to the mobile part from at least two base stations:
    receiving a response signal transmitted by the mobile part that is received by the at least two base stations;
    sensing a position and/or a motion state of the mobile part from a reception field strength of the response signal; and
    selecting, changing, or customizing at least one of the sending phases using changes in the position and/or motion states.

11. A wireless communication system comprising:
    at least two base stations configured to coherently send electromagnetic waves to a mobile part;
    wherein at least one of the base stations includes a sensor configured to determine a position of the mobile part based on propagation delay phases between the mobile part and the least two base stations.

12. The system as claimed in claim 11, wherein at least one of the base stations has a control unit to adjust relative sending phases between the electromagnetic waves sent from the at least two base stations.

13. The system as claimed in claim 11, wherein the mobile part transmits a response signal that is received by the at least two base stations, at least one of the base stations has a sensor to determine a position of the mobile part, and the sensor determines the position of the mobile part based on reception field strengths of the electromagnetic waves sent from the at least two base stations or based on reception field strengths of the response signal received at the at least two base stations.

14. The system as claimed in claim 11, wherein the mobile part is an RFID tag, and the base stations are at least one RFID transponder.

* * * * *